Nov. 22, 1955     C. A. DE GIERS     2,724,272
LIQUID WEIGHT MEASURING SYSTEM
Original Filed Nov. 14, 1949     5 Sheets-Sheet 1
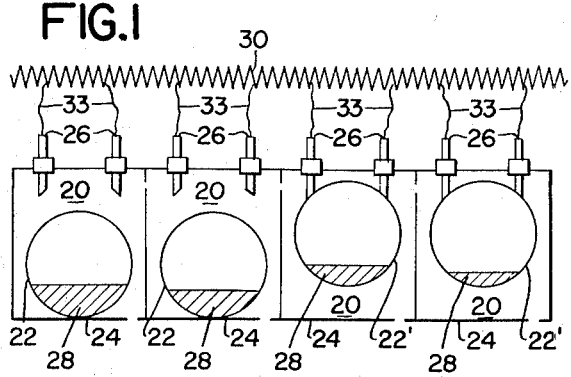
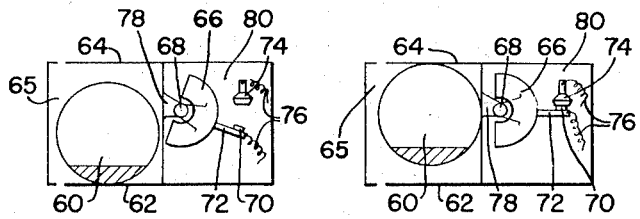
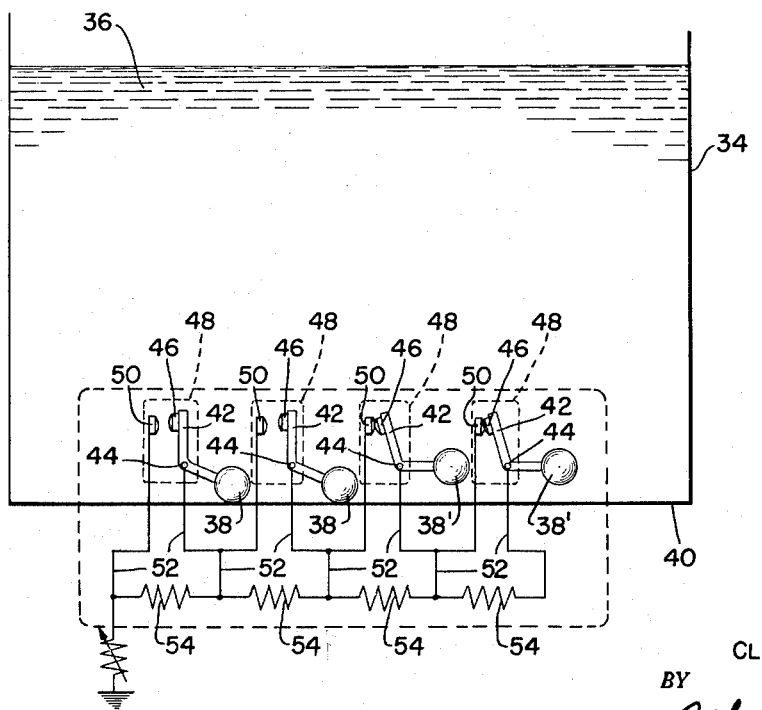
INVENTOR.
CLARENCE A. DEGIERS
BY
Robert S. Dunham
ATTORNEY.

Nov. 22, 1955     C. A. DE GIERS     2,724,272
LIQUID WEIGHT MEASURING SYSTEM
Original Filed Nov. 14, 1949     5 Sheets-Sheet 2
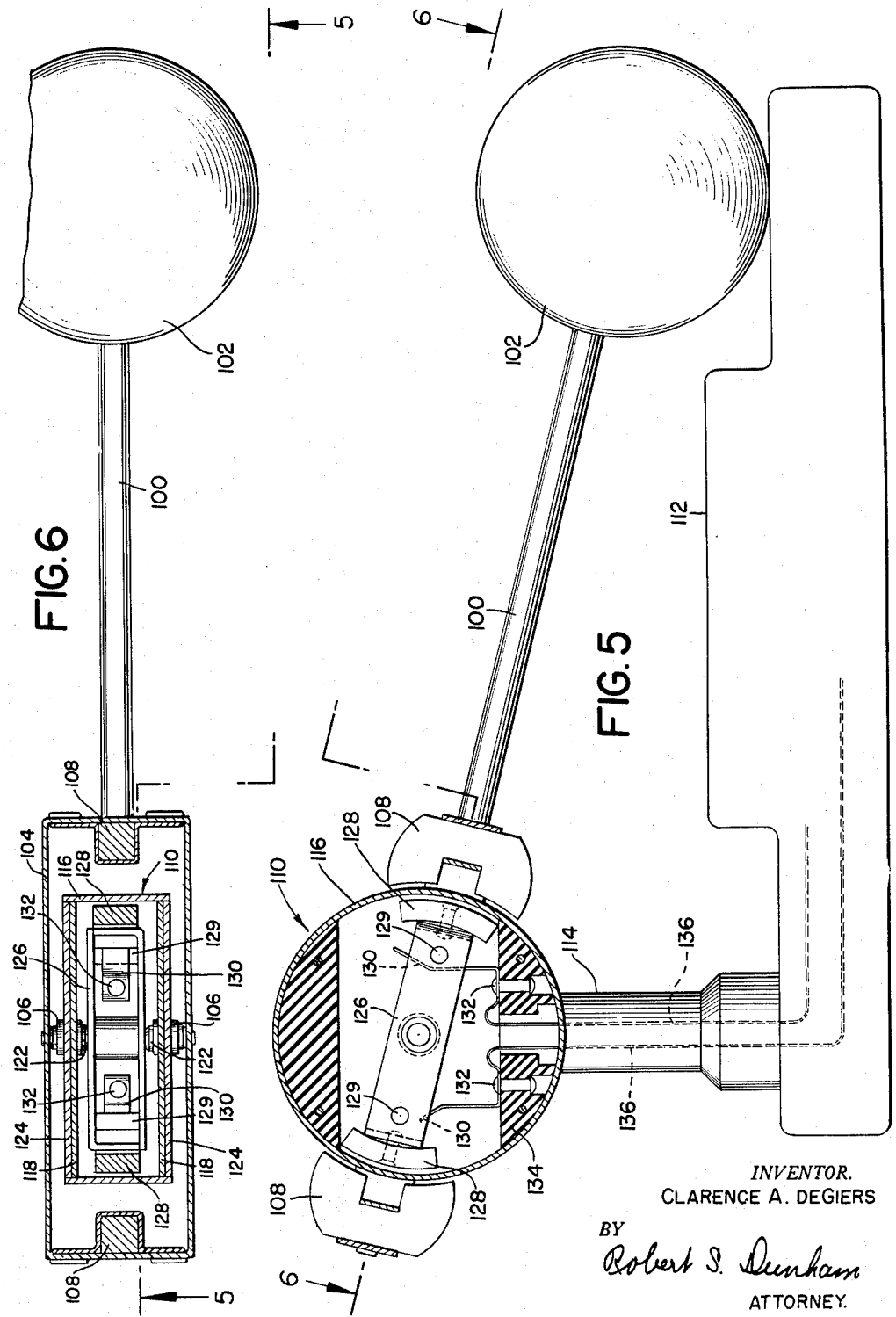
INVENTOR.
CLARENCE A. DEGIERS
BY
Robert S. Dunham
ATTORNEY.

Nov. 22, 1955  C. A. DE GIERS  2,724,272
LIQUID WEIGHT MEASURING SYSTEM
Original Filed Nov. 14, 1949   5 Sheets-Sheet 3

INVENTOR.
CLARENCE A. DEGIERS
BY
Robert S. Dunham
ATTORNEY

Nov. 22, 1955    C. A. DE GIERS    2,724,272
LIQUID WEIGHT MEASURING SYSTEM
Original Filed Nov. 14, 1949    5 Sheets-Sheet 4
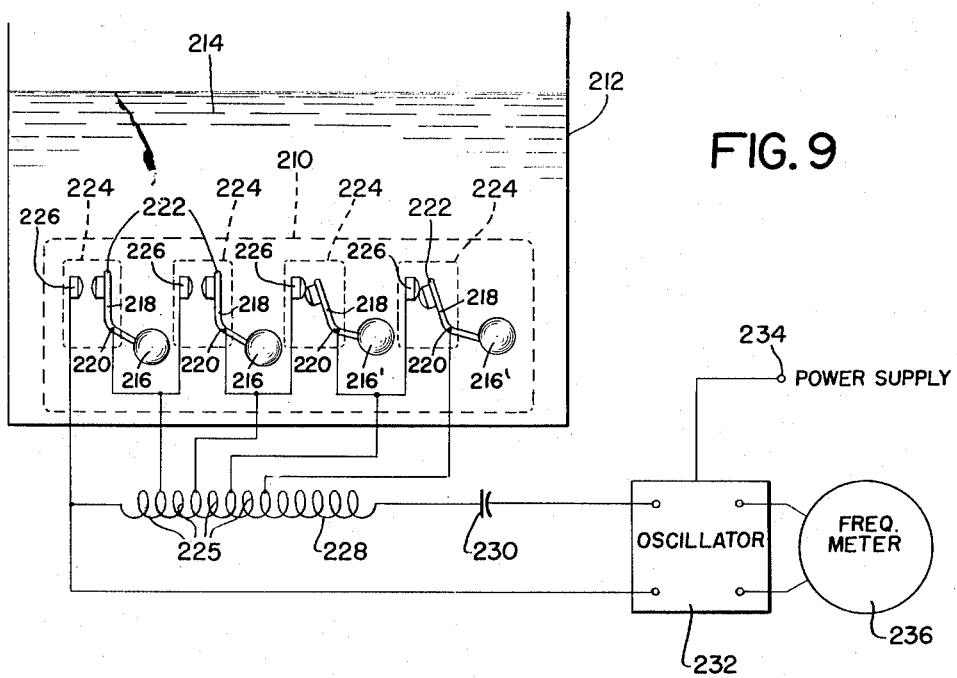
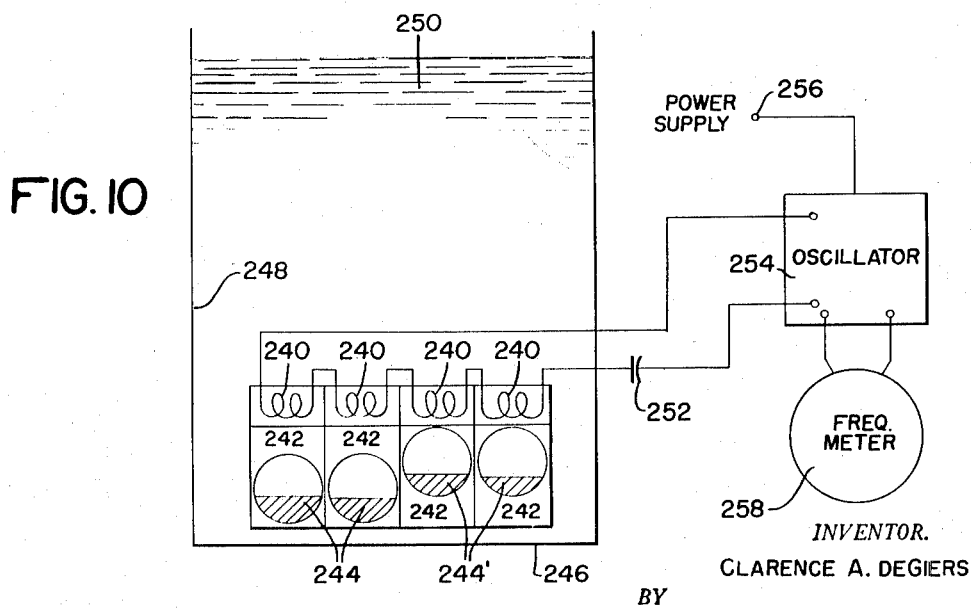
INVENTOR.
CLARENCE A. DEGIERS
BY
Robert S. Dunham
ATTORNEY Nov. 22, 1955     C. A. DE GIERS     2,724,272
LIQUID WEIGHT MEASURING SYSTEM Original Filed Nov. 14, 1949     5 Sheets-Sheet 5

*INVENTOR.*
CLARENCE A. DE GIERS
BY
Robert S. Dunham
ATTORNEY.

ated Nov. 22, 1955

United States Patent Office 2,724,272
Patented Nov. 22, 1955

2,724,272

LIQUID WEIGHT MEASURING SYSTEM

Clarence A. De Giers, Roslyn, N. Y., assignor to The Liquidometer Corporation, Long Island City, N. Y., a corporation of Delaware Original application November 14, 1949, Serial No. 127,076. Divided and this application August 2, 1952, Serial No. 302,298

14 Claims. (Cl. 73—304)

The present invention relates to a system for indicating the weight of a liquid in a container. As such, the present invention is a division of my prior and copending application, Serial Number 127,076, filed November 14, 1949, and entitled "Liquid Gravity and Weight Gauge" now Patent No. 2,691,296 issued October 12, 1954. My prior application discloses and claims a liquid density or specific gravity responsive apparatus, comprising a plurality of floats of different bulk density, within the range of the densities of liquit to be met with, for controlling a predetermined characteristic of an electric circuit as a function of the density of the liquid. In my prior application such a series of float elements have been arranged alternatively to vary the resistance, the capacitance, or the inductance of a circuit. One of these electrical characteristics, which may be generically included in the term "impedance," can be arranged in accordance with the present invention in conjunction with more or less conventional liquid volume sensing means to provide an indication of the weight of the liquid in the container. In accordance with the present invention, the means by which the density responsive means and the volume responsive means have their respective indications or sensings superimposed one on the other or suitably combined together is essentially electrical in character, this electrical system being then arranged to actuate an electrical inductor.

Such apparatus is especially useful in jet type aircraft to inform the pilot or other operating personnel of the weight of fuel present. Fuel tank gauges which involve means for temperature compensation, so as to indicate weight of fuel in the tank and hence the amount of available energy, instead of volume, are in production, and their performance is excellent as long as they are used with fuel having a density within the range for which the gauges are designed. But, while such gauges can compensate for minor variations in density, they cannot give true indications of weight when the density of the fuel used can vary considerably. Most aircraft engines of the jet type will operate on fuels of widely varying densities ranging from No. 1 fuel oil to high test gasoline.

An important feature of the invention is the use of a plurality of floats of predetermined average or bulk densities graduated within the range of the densities to be encountered, so that each float will sink or float independently of the others, depending upon the density of the liquid in which the floats are immersed, said floats being harnessed electrically to provide a progressive change in electrical resistance or reactance (either capacitive or inductive) as the density of the liquid varies. If a variable reactance is used, it, together with a fixed reactance of opposite sign, may be connected to form a series-resonant circuit, the resonant frequency of which is thus responsive to the density of the liquid. The resonant frequency may be determined by conventional means.

An object of the present invention is to provide accurate and simple apparatus which may be used in conjunction with apparatus for measuring the volume of a liquid to compensate for wide variations in the density of the liquid, and hence to indicate the weight of said liquid, instead of its volume alone.

The above and other objects and advantages will appear more fully hereinafter from consideration of the following description taken in conjunction with the accompanying drawings in which:

Figure 1 illustrates diagrammatically an arrangement for a variable resistance type density gauge;

Fig. 2 illustrates diagrammatically another arrangement for a variable resistance type density gauge;

Figs. 3 and 4 illustrate an arrangement of a float and its electric contacts in which the electric contacts and leads are isolated from the liquid;

Fig. 5 is a side elevation partly in section on the line 5—5 of Fig. 6 showing an embodiment of a float-controlled, magnetically operated switch in a density compensator which may be used in apparatus for indicating the weight of liquid in a tank;

Fig. 6 is a view on line 6—6 of Fig. 5;

Fig. 9 illustrates diagrammatically an arrangement for a variable inductance type density gauge;

Fig. 10 illustrates diagrammatically another arrangement for a variable inductance type density gauge;

I

Figure 7:
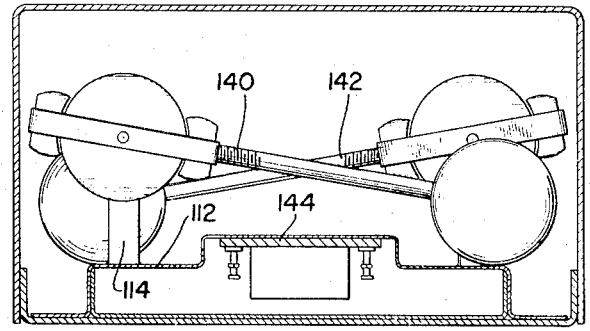
Fig. 7 is a side elevation of an installation of the embodiment of the invention shown in Figs. 5 and 6, showing a second float assembly behind the first.

The principle of this invention is best understood by reference to Fig. 1, which shows a variable resistance type density gauge. In Fig. 1, there are a number of chambers (four are shown, but there may be any number) 20, in each of which is a float 22 or 22' free to move within its confined limits, that is, from the bottom 24 of its chamber 20 to stops 26 at the top of its chamber 20. The float 22 or 22' is weighted as represented by cross-hatched section 28, so that the float 22 or 22' will rise when it is lighter than the liquid (not shown) displaced by the float 22 or 22'. The two floats 22' shown at the far right are lighter than the liquid displaced and hence have risen against the stops 26. When the float 22' rises and comes in contact with its stops 26, it closes the electric circuit between its stops 26, and shorts out a predetermined portion of an electrical resistance 30 that is connected by wires 33 to the stops 26. The operation just described is repeated as many times as there are chambers 20, each float being weighted corresponding to a different bulk density so that the specific gravity or density of the liquid will be less than that of the last float 22 resting on the bottom 24 of its chamber 20 and more than that of the first float 22' which has risen against its stops 26. Floats 22 and 22' and stops 26 are of electrically conductive material. Thus the amount of the resistance 30 not shorted out corresponds to a definite specific gravity or density, the greater being the density of the liquid, the smaller being the effective value of the resistance 30. An ammeter (not shown), for example, could be connected in series with the resistor 30 and be calibrated to read in terms of density when a potential difference is applied by conventional means (not shown) across the ends of resistor 30.

II

Fig. 2 illustrates a more refined version of the invention as embodied in Fig. 1, the apparatus being shown at the bottom of a tank 34 containing liquid 36, the density of which is to be determined. In Fig. 2 are shown two weighted floats 38 resting on the bottom 40 of the tank 34 and two weighted floats 38' which have risen due to their being lighter than the liquid 36 displaced. Again there may be any number of floats. Each of floats 38 and 38' is carried on an arm 42 pivoted about a point 44 and having on its other end a contact 46. Each contact 46 is part of a switch indicated generally at 48, the other contact being shown at 50. When a float 38' rises, its arm 42 rotates counter-clockwise until contact 46 touches contact 50, thereby closing the switch. Each switch 48 is connected by wires 52 across a corresponding resistor 54, all the resistors 54 being in series, so that when a switch 48 is closed, the corresponding resistor 54 is shorted out. As in Fig. 1, the operation just described is repeated as many times as there are floats 38 and 38', each float 38 or 38' being weighted corresponding to a different density, so that the density of the liquid will be less than that of the last float 38 resting on the bottom 40 of the tank 34 and more than that of the first float 38' which has risen to close its switch 48. Thus, again, the number of resistors 54 not shorted out corresponds to a definite specific gravity or density of the liquid 36, the greater being the density of the liquid, the smaller being the effective value of all the resistors 54. The density of the liquid can be indicated in the same way as described in connection with Fig. 1.

III and IV

To adapt the invention, i. e., varying electrical resistance or reactance through the use of a plurality of floats of different bulk densities, for use in connection with fuel in an aircraft's fuel tank, or for use in connection with other hazardous liquids, it is advisable to isolate the electrical portions, such as contacts and wires, from the liquid. Figs. 3 and 4 illustrate apparatus which accomplishes this object. We may refer to Figs. 3 and 4 together, for they show the same apparatus in two different positions. A float 60 of ferromagnetic material is surrounded by the liquid (not shown), the density of which is to be determined, and is free to move from the bottom 62 to the top 64 of a chamber 65. The float 60 will be in the former position when its bulk density is greater than that of the liquid and in the latter position when its bulk density is less than that of the liquid. As the float 60 rises, a magnetic coupling between the float and a magnet 66 causes magnet 66 to rotate counter-clockwise about a pivot point 68 on a bracket 78 until a contact 70, carried on an arm 72 attached to magnet 66, touches a contact 74, thus closing a switch formed by contacts 70 and 74. Wires 76 may connect contacts 70 and 74 across a portion of a resistance or a reactance (not shown), thus shorting out said portion when the float 60 has risen against the top 64 of its chamber 65, i. e., when the float 60 is of a bulk density less than that of the liquid. It is to be understood that magnet 66, arm 72, bracket 78, pivot point 68, contacts 70 and 74 and the wires 76 are housed in a sealed chamber 80, and are thus completely isolated from the liquid. With a plurality of installations as shown in Figs. 3 and 4, but with floats of different bulk densities, the same effect will be obtained as explained in connection with Figs. 1 and 2.

V and VI

Figs. 5 and 6, both partly in section, are a side elevation and a top view, respectively, of a float-controlled, magnetically operated switch, for use in a density gauge of the variable resistance or reactance type, the latter type to be described.

It is to be understood that the float assembly shown in Figs. 5 and 6 is but one of several float assemblies in the actual gauge, the floats being, as before, of different bulk densities graduated within the range of densities to be encountered. Fig. 7 shows one assembly mounted behind another and will be best understood after considering Figs. 5 and 6, in which a float arm 100 carries a spherical float 102 on one end, and a bifurcated box-like frame 104 on the other. Frame 104, which is supported on pivots 106, also supports a pair of magnets 108, one being mounted on each end of frame 104. A switch housing, indicated generally at 110, is centrally disposed in frame 104 and is supported on a hollow pedestal 114 which is mounted on a sealed housing 112 which may serve as a base for all the float assemblies. The switch housing comprises a sealed hollow drum having an annular shell 116 and double end plates 118 and 124 which are soldered together. Plates 118 carry pivots 122 which support a switch rocker arm (to be described), while plates 124 carry the float arm pivots 106 in alignment with pivots 122. All pivots or bearings may be jewels, in order to reduce friction. This is desirable because of the low power available. The jewels may also serve as insulators for the moving parts inside the switch housing 110.

Centrally mounted on the pivot pins 122, inside the switch housing 110, is a switch rocker arm 126, box-like in structure, of electrically conductive material and provided with a pair of iron pole pieces 128, one on each end of the switch rocker arm 126. In vertical cross-section, the iron pole pieces 128 resemble circular arcs, the centers of which are on the axis of the float arm pivots 106 and the pivot pins 122. The switch rocker arm 126 is provided with a pair of silver spacers or contacts 129 equidistant from the axis of the float arm pivots 106 and the pivot pins 122.

When the float 102 rises, due to its bulk density being less than that of the liquid surrounding it, the float arm 100 rotates counter-clockwise as seen in Fig. 5. Magnetic coupling between the magnets 108 and the iron pole pieces 128 causes switch rocker arm 126 likewise to rotate counter-clockwise. Thus the switch rocker arm 126 follows the movement of the float arm 100 as the float 102 rises or falls. As a result, when the float 102 rises, the pair of silver spacers 129 make contact (Fig. 5) one with each of a pair of brushes 130 anchored by rivets 132 on insulating material 134 on the bottom of the switch housing 110. Also anchored by the rivets 132 are the ends of lead wires 136, shown partially dotted, which are connected across part of the electric resistance or reactance (not shown), the value of which is to be responsive to the specific gravity or density of the liquid. The resistance or reactance may be located in the housing 112. The electrical connections in the case of Figs. 5 and 6 may be exactly the same as in the embodiments of the invention previously described in connection with Figs. 1, 2, 3 and 4 or as in the embodiments of variable reactance types of specific gravity gauges to be described.

VII

Fig. 7 shows how a second float assembly 142, as described in connection with Figs. 5 and 6, may be mounted behind a first float assembly 140 on the base 144. As many such assemblies may thus be mounted as desired or needed.

VIII

Figure 8:
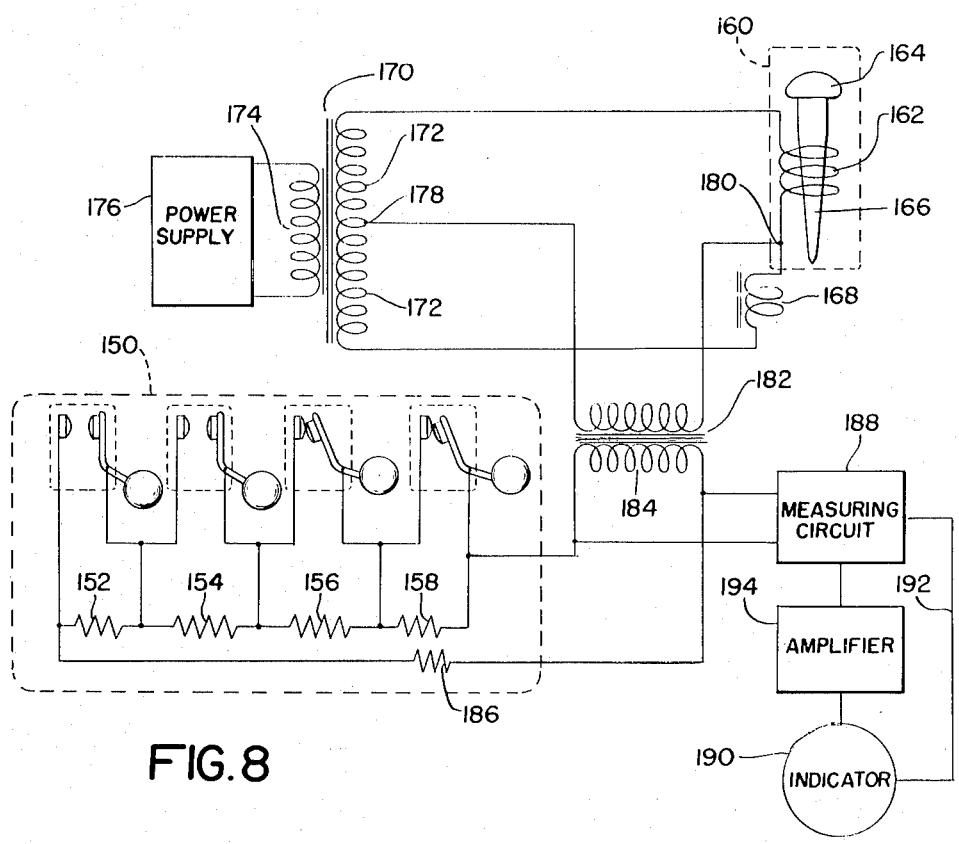
Fig. 8 illustrates diagrammatically a device for indicating the weight of liquid in a tank, in which a variable resistance type density gauge is used as a compensator with a variable inductance type fuel quantity indicator.

One of the important uses which can be made of the invention is as a density compensator in a gauge for indicating the weight of a liquid, such as gasoline, in a tank. To make such a gauge, the density compensator may be inserted in a circuit which would otherwise constitute a gauge for indicating merely the volume of liquid. Fig. 8 shows diagrammatically a circuit including a density compensator of the variable resistance type which can be used to indicate the weight of the liquid. The compensator, indicated generally at 150, is similar to that illustrated in Fig. 2, although it could just as well be any one of the variations. The compensator 150 controls, in the manner described, the effective value of a group of resistors 152, 154, 156 and 158, only four being shown.

The fuel volume measuring element, indicated generally at 160, is a variable inductance coil 162, which is responsive to the liquid level by means of a float 164 connected to a permeable core 166 arranged to move into or out of the coil 162 as the float 164 rises or falls in response to changes in liquid level, the liquid not being shown. This movement changes the inductance of the coil 162. It is to be noted that the liquid level responsive device, here the coil 162, in itself compensates for minor changes in liquid density, but is ineffective when the density varies widely, as it may from time to time in the case of fuel in the tanks of jet type aircraft. The coil 162 is an element of a bridge circuit which includes, in addition to coil 162, a reference coil 168, and the secondary 172 of a transformer 170 which may be energized by an audio frequency power supply 176 connected across the primary 174 of the transformer 170. The output of the bridge circuit is taken between a tap 178 on the secondary 172 and a point 180 between the coil 162 and the reference coil 168, and is fed to an output transformer 182. The secondary 184 of the transformer 182 is shunted by the resistors 152, 154, 156 and 158, and by another resistor 186 of the density compensator 150. While shunt connections of the resistors have been shown, series connections or potentiometer connections may be used. A measuring circuit 188 is connected across the secondary 184 of the output transformer 182 and will detect the output of the bridge circuit, and may compare it with a reference signal from an indicator 190 by a feed-back connection 192. The resulting signal may be amplified by an amplifier 194 and be made to control the indicator 190. This, in effect, is a servo type circuit.

In operation, the bridge will be arranged to be in balance (that is, no output) when there is no liquid in the tank. Under this condition, all the floats of the compensator will be down, a condition which would correspond to having the tank full of very light liquid. However, since the output is zero, there will be no error in the reading of the indicator 186. As the tank is filled, the bridge will become more and more unbalanced due to change in the inductance of the coil 162, and the output of the bridge to the measuring circuit 188 will become progressively greater. If the density of the liquid now changes, the compensator 150 will further modify the output of the bridge by cutting out resistors or by adding them to the circuit depending on the direction of the variation. Thus, the final reading of the indicator will be a truer indication of the contents of the tank by weight than if the compensator 150 were omitted. It should be understood that the volume-responsive element 160 could just as well be capacitive, in which case the reference coil 168 would be replaced by a reference capacitance.

IX

The invention, as embodied in a variable reactance type specific gravity or density gauge, may be understood by referring to Fig. 9, in which any number of float assemblies collectively indicated at 210 (only four are shown) are near the bottom of a tank 212 containing liquid 214, the specific gravity or density of which is to be determined. Each float assembly comprises a float 216 or 216′ carried on one end of an arm 218 pivoted at a point 220. Each float 216 is shown at the lower end of its arc, while each float 216′ is shown at the upper end of its arc. On the other end of each arm 218 is an electric contact 222, which is part of a switch indicated generally at 224, the other contact being shown at 226. When a float 216′ travels upwardly along its arc, due to its bulk density being less than that of liquid 214, its arm 218 rotates counterclockwise (as seen in Fig. 9) until contact 222 touches contact 226, thereby closing switch 224. Each switch 224 is connected across a respectively predetermined portion 225 of an inductance 228, so that when a switch 224 is closed, its corresponding predetermined portion 225 of inductance 228 is shorted out. Coil 228 is shown as a single coil tapped at various sections, but it will be understood that a number of separate coils may be used. The operation just described may be repeated as many times as there are floats 216 and 216′, each float 216 or 216′ being weighted corresponding to a different bulk density, so that the specific gravity or density of the liquid 214 will be less that that of the last float 216 at the lower end of its arc and greater than that of the first float 216′ at the upper end of its arc. Thus, the amount of the inductance 228 not shorted out corresponds to a definite specific gravity or density of the liquid 214, the greater being the specific gravity or density of the liquid, the smaller being the effective value of the inductance 228. Coil 228 is connected in series with a condenser 230, which together form a series-resonant circuit, the resonant frequency of which is a definite function of the value of the inductance 228, and is given by the formula $$f = \frac{1}{2\pi\sqrt{LC}}$$

where $f$ is the resonant frequency in cycles per second, L is the inductance of the coil 228 in henrys, and C is the capacity of the condenser 230 in farads. The resonant frequency of the circuit including coil 228 and condenser 230 controls the frequency of oscillation of a variable frequency oscillator 232, shown in block form, which may be so constructed that it will oscillate at said resonant frequency, as is well known in the art. The oscillator 232 is energized by a power supply 234. The frequency of oscillation of oscillator 232 may be measured by any convenient form of frequency meter, shown in block form at 236, which may be calibrated to indicate specific gravity or density directly.

In operation, the density-sensitive floats 216 and 216′ may be placed in tank 212 for the purpose of determining the specific gravity or density of the liquid 214 therein. If it be assumed that the liquid 214 is of an average density, the system can be adjusted so that, for example, half the floats 216 are at the bottoms of their arcs and the other half are at the tops of their arcs. This means that half the switches 224 will be open and the other half will be closed. Thus some of the turns of coil 228 will be shorted out, causing the oscillator 232 to generate a signal of a definite fixed frequency. If a lighter liquid is now placed in the tank 212, the float 216′ having the greatest bulk density will also sink, thereby opening its switch and increasing the inductance of the coil 228, thus causing the oscillator 232 to generate a signal of lower frequency. However, if the substituted liquid has a greater density than does the original liquid 214, the float 216 having the smallest bulk density will rise, thereby closing its switch 224. This shorts out more of the coil 228 and decreases its inductance, thereby causing the oscillator 232 to generate a signal of greater frequency. The frequency meter 236 can then be conveniently calibrated to indicate specific gravity density directly.

X

The apparatus shown in Fig. 10 is in most particulars identical with that of Fig. 9. The only exception lies in the method of changing the inductance of the inductive element of the series-resonant circuit. In the case of Fig. 10, any number of separate coils 240 (only four are shown) are used, each placed near the top of a chamber 242 containing a float 244 or 244′ free to move from the bottom to the top of its chamber 242. Chambers 242 are near the bottom 246 of a tank 248 containing liquid 250, the specific gravity or density of which is to be determined. The floats 244 and 244′ have bulk densities graduated within the range of densities to be encountered, as explained in the description of Fig. 9. Each float 244 or 244' is adjusted so that, responsive to the density of liquid 250, it will approach or recede from its respective coil 240. As a float 244' rises in the liquid 250 surrounding it, it approaches its corresponding coil 240, increasing the inductance thereof, the floats 244 and 244' being of ferromagnetic material. As before, the rest of the circuit comprises a condenser 252 in series with coils 240, an oscillator 254 connected also to a power supply 256 and a frequency meter 258 which may be conveniently calibrated to read specific gravity or density directly.

For operation, again the system can be adjusted so that for liquid of average specific gravity or density, half the floats, i. e. floats 244 will be down (of bulk density greater than that of the liquid) and half the floats, i. e. floats 244' will be up (of bulk density less than that of the liquid), resulting in a mid-scale reading of the frequency meter 258. If liquid of greater than average specific gravity or density is substituted, one of the floats 244 will rise, thus coming closer to its corresponding coil 240 and increasing its inductance. This decreases the frequency generated by the oscillator 254 again in accordance with the formula $$f = \frac{1}{2\pi\sqrt{LC}}$$

On the other hand, if lighter than average liquid is substituted, the opposite effect will occur, that is, one of the floats 244' will sink, thus receding from its corresponding coil 250, and the effective inductance of the coils 240 will decrease correspondingly. This increases the frequency of the signal generated by the oscillator 254.

XI

Figure 11:
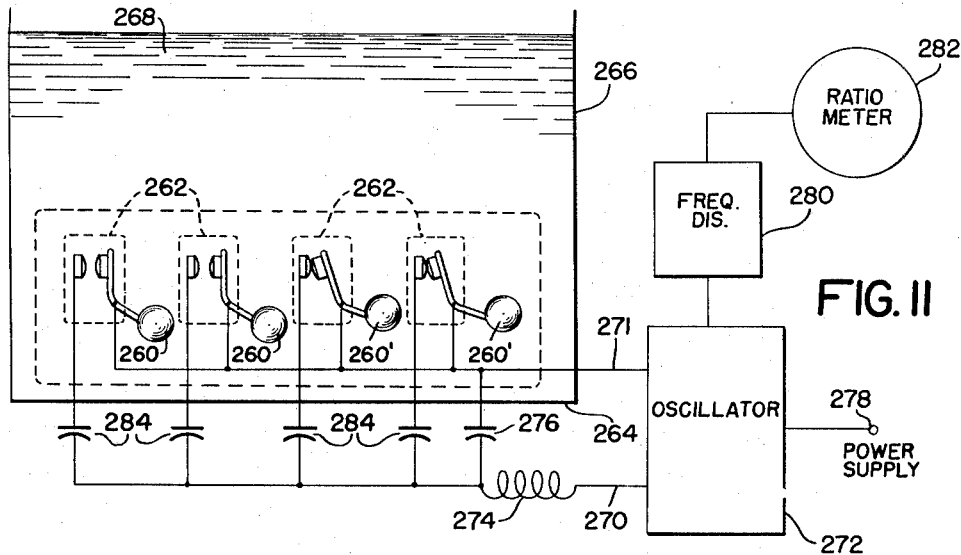
Fig. 11 illustrates diagrammatically an arrangement for a variable capacitance type density gauge.

The circuit shown in Fig. 11 is in general similar to those of Figs. 9 and 10, in that it contains a series-resonant circuit including inductive and capacitive elements. However, in this case, instead of varying the inductive element responsive to changes in the specific gravity or density of the liquid under test, as done in the circuits of Figs. 9 and 10 the capacity is changed. The arrangement of the floats shown in Fig. 11 at 260 and 260' and their corresponding switches, shown generally in Fig. 11 at 262, is exactly the same as in the apparatus shown in Fig. 9 and need not be described again. Again, the float assembly is illustrated near the bottom 264 of a tank 266 containing the liquid 268 under test. The series-resonant circuit in the case of Fig. 11 starts with a lead wire 270 from a variable frequency oscillator 272, and comprises a fixed inductance 274 in series with a condenser 276, which is connected by a lead 271 back into the oscillator 272. The oscillator 272 again is energized by a power supply 278, but as a variation from the circuits described in connection with Figs. 9 and 10, the oscillator 272 is arranged to feed into a frequency discriminator 280 from which suitable currents may be derived to operate a ratiometer 282 and a pointer (not shown).

One side of each switch 262 is connected to the lead 271 and a condenser 284 is connected in series with the other side of each switch 262 respectively. The side of each condenser 284 remote from its corresponding switch 262 is connected to the end of the coil 274 remote from the oscillator 272. Thus when a float 260' is at the top of its arc, due to its bulk density being less than that of the liquid 268, its corresponding switch 262 is closed. With the switch in this condition, the corresponding condenser 284 will be connected in parallel with the condenser 276.

In operation, the apparatus may be adjusted so that for a liquid of average specific gravity of density, half the floats, i. e. the floats 260 will be at the bottom of their arcs and half the floats, i. e. the floats 260' will be at the tops of their arcs. If a liquid of greater than average specific gravity or density is substituted, one of the floats 260 will rise, thus closing its switch 262, and connecting its corresponding condenser 284 in parallel with the condenser 276. Thereby, the overall capacity of the series-resonant circuit including the coil 274 and the condenser 276 is increased, since when two condensers are connected in parallel, the equivalent series capacitance is the sum of the capacitances of the two condensers. Conversely, if a liquid of less than average specific gravity or density is substituted, one of the floats 260' will sink, thus opening its switch 262 and decreasing the capacitance of the series-resonant circuit by the value of its corresponding condenser. As is the case in the circuits shown in Figs. 9 and 10, these changes in the specific gravity or density of the liquid under test are reflected in changes in the frequency of the signal generated by the oscillator 272. When the capacitance increases (due to an increase in specific gravity or density), the generated frequency decreases, and vice versa. These frequency changes are in turn reflected by changes in the indicator readings, as in the other circuits.

XII

Figure 12:
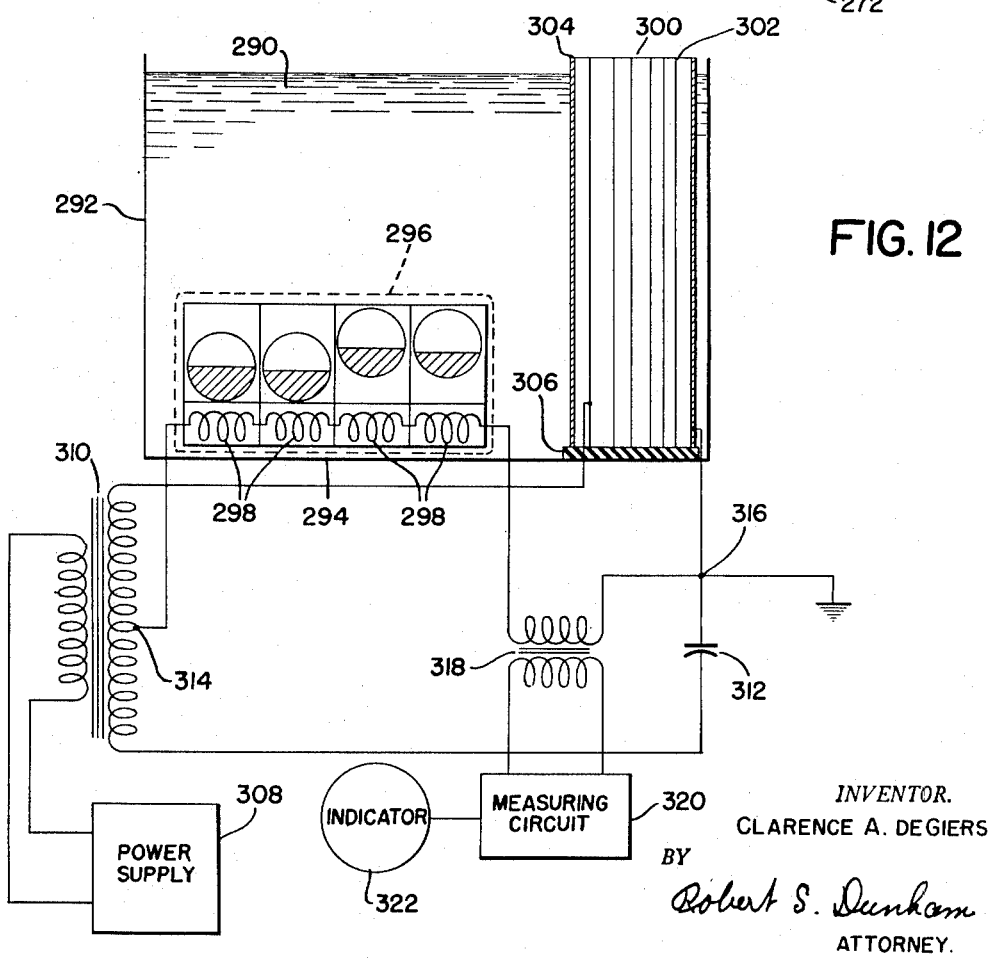
Fig. 12 illustrates diagrammatically a device for indicating the weight of liquid in a tank, in which a variable inductance type density gauge is used as a compensator with a variable capacitance type fuel quantity indicator.

As is the case with a variable resistance type gauge, one of the important uses which can be made of a variable reactance type specific gravity or density gauge is as a density compensator in a gauge for indicating the weight of a liquid, such as gasoline, in a tank. To make such a gauge, the density compensator may be inserted in a circuit which would otherwise constitute a gauge for indicating merely the volume of liquid present. Fig. 12 shows diagrammatically a circuit including a density compensator which can be used to indicate the weight of a liquid 290 in a tank 292. In Fig. 12, the compensator, shown near the bottom 294 of the tank 292, is indicated generally at 296, and is similar to that illustrated in Fig. 10, except that as a matter of convenience, the unit is turned upside down. The compensator 296, which, in the manner described, controls the inductance of a group of coils 298, could just as well be of the variable capacitance type, as shown in Fig. 11.

The fuel volume responsive element is a condenser, formed of inner and outer spaced concentrically-positioned metal cylinders 302 and 304, which are supported vertically in the tank 292 by insulating supports, as at 306, which may be formed of any suitable insulating material. The cylinders 302 and 304 extend substantially from the bottom to the top of the tank 292, so that the capacitance of the condenser 300 is a function of the depth of liquid in the tank 292. The depth of liquid between the plates 302 and 304 of the condenser 300 is the same as that in the rest of the tank 292. The capacitance is a function of liquid level because capacitance depends upon the dielectric constant of the insulating medium between the plates of the condenser, gasoline, for example, having a dielectric constant of approximately two, the dielectric constant of air being one. Therefore, when the air between the condenser plates 302 and 304 is replaced by gasoline, the capacity of the condenser increases by a factor of two, with proportional changes taking place when the gasoline only partially fills the space between the condenser plates 302 and 304.

A fuel quantity indicator of the variable capacitance type in itself compensates for minor variations in liquid density, but is ineffective when the density varies over a wide range, as it may in the case of fuel for most jet-type aircraft engines. In such a case, the density compensator will substantially reduce the effects of such wide variations.

In the apparatus shown in Fig. 12, the circuit may be energized by an audio frequency power supply 308. The output of the power supply 308 is applied to a bridge circuit comprising an input transformer 310, the volume responsive condenser 300, and a reference condenser 312, both of the last-mentioned elements being in series with the output of the transformer 310. The output of the bridge circuit is taken from a point 314 on the secondary of the transformer 310 to a second point 316 which is grounded between the condensers 300 and 312. Between points 314 and 316 are the density compensator 296 and the primary of an output transformer 318 in series. The output secondary of the transformer 318 feeds into a measuring circuit 320 which will detect the output of the bridge circuit and in turn will operate an indicator 322 which may be conveniently calibrated to read, for example, in pounds of liquid.

For operation, the bridge circuit may be adjusted so that when there is no liquid in the tank, the bridge circuit will be in balance (that is, no output). Under this condition, all the floats of the compensator 296 will be down, a condition corresponding to having the tank 292 filled with liquid of very low specific gravity. However, since the output is zero, there will be no error in the reading of the indicator 322. As the tank 292 is filled, the bridge will become more and more unbalanced, due to the increase (already explained) in the capacitance of the condenser 300. The result will be a greater and greater output to the measuring circuit 320. If the density of the liquid now changes, the inductance of the coils 298 in the compensator 296 will also change, thus modifying the output to the measuring circuit 320 through the transformer 318 by causing a smaller or greater voltage to be applied thereto, depending upon whether the liquid density has increased or decreased. If the density has increased, more floats of the compensator 296 will rise, thus decreasing the inductance of the coils 298. In this event, a greater voltage will be applied across the transformer 318, thereby increasing the output to the measuring circuit 320.

The described apparatus will be seen to provide a simple, accurate and reliable measurement and indication of the specific gravity or density of a liquid in accordance with the objectives of the present invention, but it is to be understood that the invention is not limited to the specific embodiments herein illustrated and described, but may be used in other ways without departure from its spirit as defined by the following claims.

What is claimed is:

1. A system for indicating the weight of a liquid in a container, comprising an electrical network providing two electrically spaced circuit output terminal points, at least two circuit branches connected between said points, an electrical impedance means having an impedance value which is a function of the volume of said liquid in said container connected in one of said circuit branches, a compensating electrical impedance means connected in another of said circuit branches, means for energizing said network by applying to said circuit branches including both said impedance means respectively A. C. electrical energy of opposing phase, output circuit means connected to said terminal points; means responsive to the density of the liquid in said container, an electric circuit branch which is electrically coupled to said output circuit means, means for controlling the impedance of said electric circuit branch by said density responsive means and in accordance with the density of said liquid, and an electrical indicating means electrically coupled to said output circuit means and responsive to current flow therein as affected by the impedance of said electric circuit branch for indicating the weight of the liquid in the container.

2. A system for indicating the weight of a liquid in a container, comprising an A.-C. energized bridge circuit, means responsive to the volume of the liquid in said container for varying the reactance of one arm of said bridge circuit, a plurality of electric circuit components, means responsive to the density of the liquid in said container and constructed and arranged to control the effective impedance of said electric circuit components, means connecting said electric circuit components into the output of said bridge circuit, so as to introduce into the electrical output of said bridge circuit an electrical function of the density of said liquid, and means responsive to the output of said bridge circuit as affected by the density of said liquid as aforesaid for indicating a value proportional to the weight of the liquid in said container.

3. A system in accordance with claim 2, wherein said volume responsive means comprises a capacitor including electrodes which are located in said container so as to be immersed in the liquid therein to an extent dependent upon the level of such liquid, so that the capacitance of said capacitor is a function of liquid level, said capacitor being connected in one arm of said bridge circuit.

4. A system in accordance with claim 2, and wherein said volume responsive means comprises a variable inductor, the inductance of which is controlled as a predetermined function of the level of the liquid in said container, said variable inductor being connected in one arm of said bridge circuit.

5. A system for indicating the weight of a liquid in a container, comprising means responsive to the volume of the liquid in the container, an electrical bridge circuit connected to be energized from a source of electric energy and including one arm, the impedance of which is controlled by said volume responsive means as a function of the volume of the liquid in the container, means responsive to the density of the liquid in the container, electrical means controlled by said density responsive means and electrically connected with the output of said bridge circuit for electrically introducing a function of the density of said liquid into the electrical characteristics of the output of the bridge circuit to produce a resultant electrical output, and electrically controlled indicating means responsive to said resultant electrical output of said bridge circuit as affected both by said volume responsive means and by said density responsive means for indicating the weight of said liquid.

6. A system for indicating the weight of a liquid in a container, comprising means responsive to the volume of the liquid in the container, an electrical bridge circuit connected to be energized from an A. C. source of electric energy and including one arm, the impedance of which is controlled by said volume responsive means as a function of the volume of the liquid in the container, a transformer having its primary winding connected to the output of said bridge circuit, electrically controlled indicating means connected to the secondary winding of said transformer, means responsive to the density of the liquid in the container, and electrical means controlled by said density responsive means and electrically connected to one of the windings of said transformer for introducing a function of liquid density into the electrical control of said indicating means, so that said indicating means may directly indicate the weight of the liquid in said container.

7. A system according to claim 6, wherein said electrical means controlled by said density responsive means is effective to control the impedance of an electrical branch connected in parallel with the secondary winding of said transformer.

8. A system according to claim 6, wherein said electrical means controlled by said density responsive means is effective to control the resistance of an electrical branch connected in parallel with the secondary winding of said transformer.

9. A system according to claim 6, wherein said electrical means controlled by said density responsive means is effective to control an electrical impedance which in turn directly affects the current flow through the primary winding of said transformer.

10. A system according to claim 6, wherein said electrical means controlled by said density responsive means comprises a variable inductance connected in series with the primary winding of said transformer across the output of said bridge circuit.

11. A system for indicating the weight of a liquid in a container, comprising a bridge circuit, said bridge circuit including first variable reactance means responsive to the volume of said liquid, second reactance means of the same sign as said first reactance means, and third reactance means comprising the input of said bridge, a power supply to energize said input, the output of said bridge being connected from a point on said third reactance means to a point between said first and second reactance means, a variable resistance type density compensator responsive to the density of the liquid in the container for controlling the resistance of an electrical branch in accordance with the density of the liquid in the container, means electrically connecting said electrical branch into the output of said bridge, and indicating means responsive to the output of said bridge as affected by said compensator as aforesaid for indicating the weight of said liquid in the container.

12. A system for indicating the weight of a liquid in a container, comprising a power supply connected across the primary of an input transformer, a variable inductance responsive to changes in the volume of said liquid, a reference inductance, an electric circuit connecting said variable inductance and said reference inductance in series across the secondary of said input transformer, said variable inductance, said reference inductance, and said secondary of said input transformer forming a bridge circuit, the output of said bridge circuit thus being responsive to the volume of said liquid, an output transformer having its primary winding connected from a point on the secondary of said input transformer to a point between said variable inductance and said reference inductance, a measuring circuit shunted across the secondary winding of said output transformer and responsive to the output of said output transformer, a variable resistance type density compensator responsive to the density of the liquid in the container and also shunted across the secondary winding of said output transformer, the input to said measuring circuit thus being further responsive to the density of said liquid, said measuring circuit including an indicator for indicating the weight of said liquid.

13. A system for indicating the weight of a liquid in a container, comprising a bridge circuit, said bridge circuit including first variable reactance means responsive to the volume of said liquid, second reactance means of the same sign as said first reactance means, and a third reactance means which is the input of said bridge, a variable reactance density compensating device responsive to the density of the liquid in the container and connected in series with the output of said bridge, said output and said compensating device being connected from a point on said third reactance means to a point between said first and said second reactance means, and indicating apparatus responsive to the output of said bridge as affected by said compensating device for measuring the weight of said liquid.

14. A system for indicating the weight of a liquid in a container, comprising a power supply connected across the primary of an input transformer, a variable capacitance responsive to changes in the volume of said liquid, a reference capacitance, an electric circuit connecting said variable capacitance and said reference capacitance in series across the secondary of said input transformer, said variable capacitance, said reference capacitance, and said secondary of said input transformer forming a bridge circuit, the output of said bridge circuit being responsive to the volume of said liquid, an output transformer, a variable inductance density compensating device responsive to the density of the liquid in the container and connected in series with the primary winding of said output transformer, said compensating device and said primary winding of said output transformer being connected by an electric circuit from a point on said secondary of said input transformer to a grounded point between said variable capacitance and said reference capacitance, and a measuring circuit including an indicator responsive to the output of said output transformer for measuring the weight of said liquid.

References Cited in the file of this patent

UNITED STATES PATENTS

| | | |
|---|---|---|
| 2,082,539 | Fischer | June 1, 1937 |
| 2,363,690 | Razek | Nov. 28, 1944 |
| 2,570,218 | Draganjac | Oct. 9, 1951 |
| 2,581,085 | Edelman | Jan. 1, 1952 |

FOREIGN PATENTS

| | | |
|---|---|---|
| 441,576 | Great Britain | Jan. 22, 1933 |
| 696,522 | Great Britain | Sept. 2, 1953 |